(12) United States Patent
Santini

(10) Patent No.: US 10,954,979 B1
(45) Date of Patent: Mar. 23, 2021

(54) HIDDEN EXTRUSION CONNECTOR

(71) Applicant: Patrick J. Santini, West Bend, WI (US)

(72) Inventor: Patrick J. Santini, West Bend, WI (US)

(*) Notice: Subject to any disclaimer, the term of this patent is extended or adjusted under 35 U.S.C. 154(b) by 469 days.

(21) Appl. No.: 15/964,173

(22) Filed: Apr. 27, 2018

(51) Int. Cl.
*F16B 7/18* (2006.01)
*F16B 7/04* (2006.01)

(52) U.S. Cl.
CPC ............ *F16B 7/18* (2013.01); *F16B 7/0433* (2013.01); *F16B 7/187* (2013.01)

(58) Field of Classification Search
CPC .. E04B 1/5818; E04B 9/10; E04B 2001/1936; E04B 2001/2472; E04F 2011/1827; E04H 17/143; F16B 7/0433; F16B 7/0446; F16B 7/0453; F16B 7/18; F16B 7/187; F16B 12/14; F16B 12/30; F16B 12/42; Y10T 403/348; Y10T 403/39; Y10T 403/4602; Y10T 403/7041
USPC .................................. 403/177, 187, 231, 362
See application file for complete search history.

(56) References Cited

U.S. PATENT DOCUMENTS

| | | | | |
|---|---|---|---|---|
| 4,923,322 A | * | 5/1990 | Burg | F16B 7/0446 403/234 |
| 10,415,617 B2 | * | 9/2019 | Chen | F16B 7/0453 |
| 2007/0154258 A1 | * | 7/2007 | Knapp | F16B 12/20 403/331 |

FOREIGN PATENT DOCUMENTS

| | | | | |
|---|---|---|---|---|
| DE | 4244396 A1 | * | 6/1994 | ............ F16B 7/187 |
| DE | 19507263 A1 | * | 9/1995 | ............ F16B 7/187 |
| DE | 10200964 A1 | * | 7/2003 | ............ F16B 7/187 |
| DE | 202012104771 U1 | * | 1/2013 | ............ F16B 7/187 |
| DE | 102014205400 A1 | * | 9/2015 | ............ F16B 12/30 |
| DE | 202017002150 U1 | * | 5/2017 | ............ F16B 2/04 |
| EP | 1070859 A2 | * | 1/2001 | ............ F16B 7/187 |
| EP | 1574725 A1 | * | 9/2005 | ............ F16B 7/187 |
| EP | 1635075 A2 | * | 3/2006 | ............ F16B 7/187 |
| FR | 1245042 A | * | 11/1960 | ............ F16B 12/42 |
| FR | 2330898 A1 | * | 6/1977 | ............ F16B 7/187 |

OTHER PUBLICATIONS

An inside corner connector sold by 80/20 Inc. is shown connecting a horizontal extrusion to a vertical extrusion in a You Tube video at www.youtube.com/watch?v=FuEt4bOq9Wg.

* cited by examiner

*Primary Examiner* — Josh Skroupa
(74) *Attorney, Agent, or Firm* — Donald J. Ersler

(57) ABSTRACT

A hidden extrusion connector preferably includes a base bar and at least one vertical bar. The base bar includes a rectangular cross section, which is sized to be received by an inner channel of a first extrusion. A plurality of base threaded holes are formed vertically through the base bar. Each vertical bar includes a rectangular section, which is sized to be received by an inner channel of a second extrusion. A plurality of threaded holes are formed horizontally through the vertical bar. A threaded post extends from a bottom of the vertical bar. The threaded post is sized to be threadably received by one of the plurality of threaded holes in the base bar. The plurality of threaded holes in the base bar and the vertical bar are sized to threadably receive a threaded fastener, such as a set-screw.

6 Claims, 3 Drawing Sheets

HIDDEN EXTRUSION CONNECTOR

BACKGROUND OF THE INVENTION

1. Field of the Invention

The present invention relates generally to extrusions and more specifically to a hidden extrusion connector, which may be used to secure at least two extrusions that are perpendicular to each other.

2. Discussion of the Prior Art

An inside corner connector manufactured by 80/20 Inc. is illustrated connecting a horizontal extrusion to a vertical extrusion in a You Tube video at www.youtube.com/watch?v=FuEt4bOg9Wg. However, the inside corner connector does not teach or suggest a hidden extrusion connector, with a base that allows multiple vertical fastening members to be retained in the base.

Accordingly, there is a clearly felt need in the art for a hidden extrusion connector, which may be used to secure at least two extrusions that are perpendicular to each other.

SUMMARY OF THE INVENTION

The present invention provides a hidden extrusion connector, which may be used to secure at least two extrusions that are perpendicular to each other. The hidden extrusion connector preferably includes a base bar and at least one vertical bar. The base bar includes a rectangular cross section, which is sized to be received by an inner channel of a first extrusion. A plurality of base threaded holes are formed vertically through the base bar. Each vertical bar includes a rectangular section, which is sized to be received by an inner channel of a second extrusion. A plurality of threaded holes are formed horizontally through the vertical bar. A threaded post extends from a bottom of the vertical bar. The threaded post is sized to be threadably received by one of the plurality of base threaded holes in the base bar. The plurality of base threaded holes in the base bar and the vertical bar are sized to threadably receive a set-screw or other threaded fastener.

In use, a base bar is slipped into the inner channel of the first extrusion. The vertical bar is slipped into the inner channel of the second extrusion. The threaded post of the vertical bar is screwed into one of the plurality of base threaded holes, until a rectangular portion of the vertical bar is secured against the first extrusion. The two set screws in the vertical bar are tightened against the second extrusion. The set screw in the base bar is also tightened to secure the first extrusion to the second extrusion. The vertical bar may also be pre-threaded into the base bar and inserted into the inner channel of the first extrusion, if a lengthwise axis of a cross-section of the vertical bar is parallel to a lengthwise axis of the base bar.

Accordingly, it is an object of the present invention to provide a hidden extrusion connector, which may be used to secure at least two extrusions that are perpendicular to each other.

These and additional objects, advantages, features and benefits of the present invention will become apparent from the following specification.

DETAILED DESCRIPTION OF THE PREFERRED EMBODIMENTS

Figure 1:
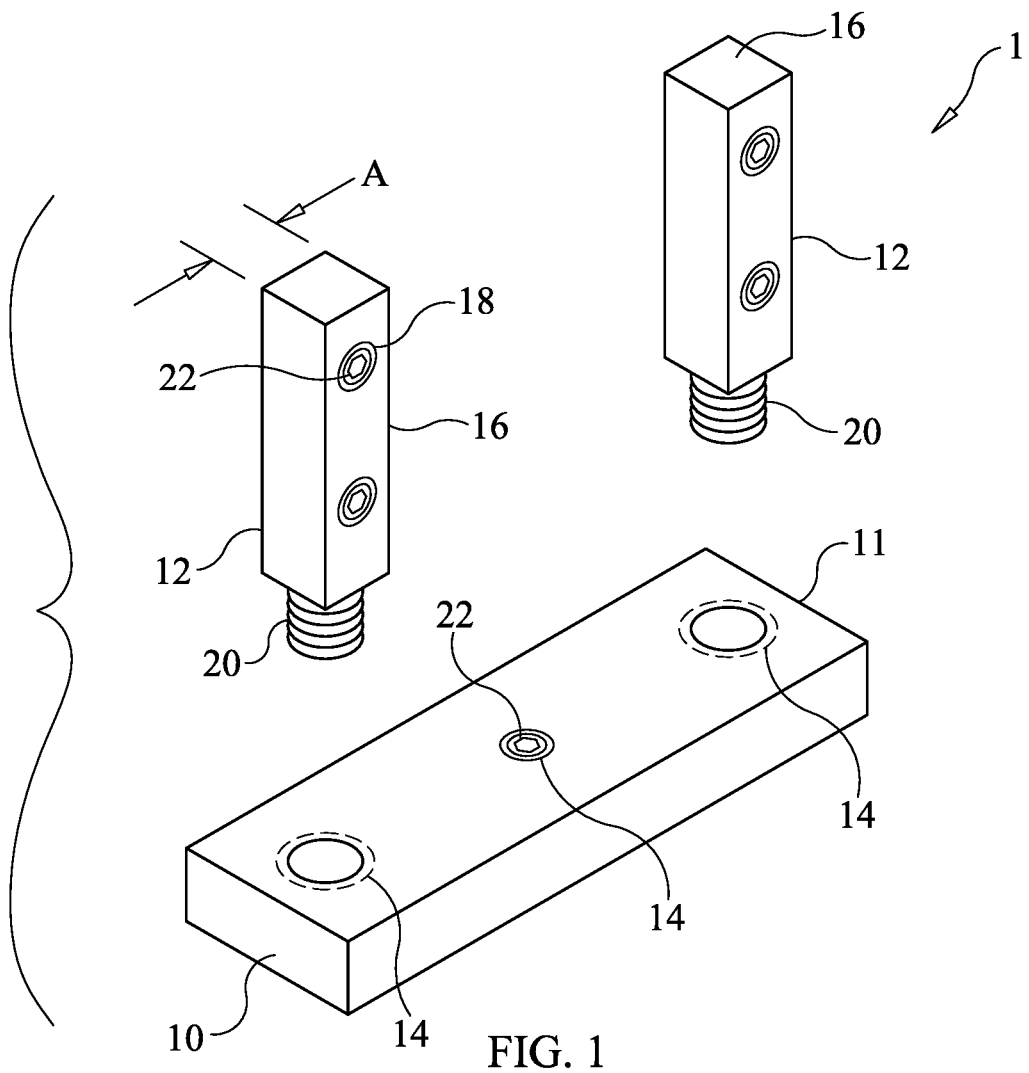
FIG. 1 is an exploded perspective view of two vertical bars and a base bar of a hidden extrusion connector in accordance with the present invention.
Figure 2:
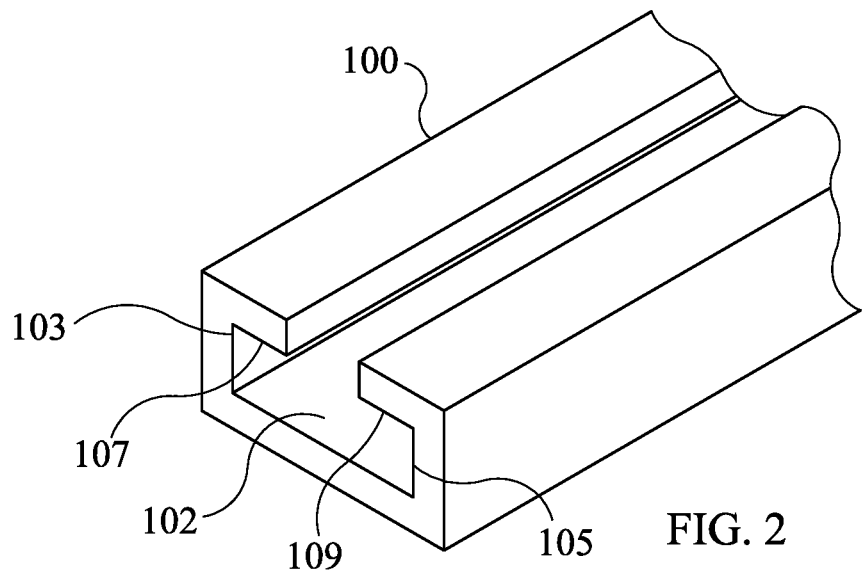
FIG. 2 is a partial perspective view of an extrusion.
Figure 3:
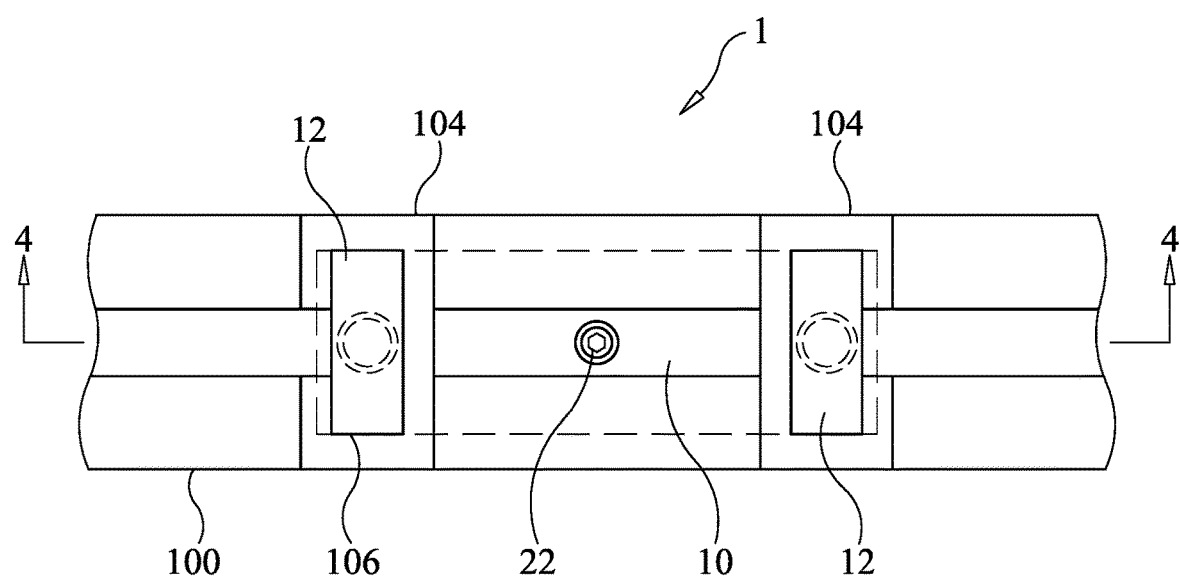
FIG. 3 is a top view of two vertical extrusions attached to a horizontal extrusion with a hidden extrusion connector in accordance with the present invention.
Figure 4:
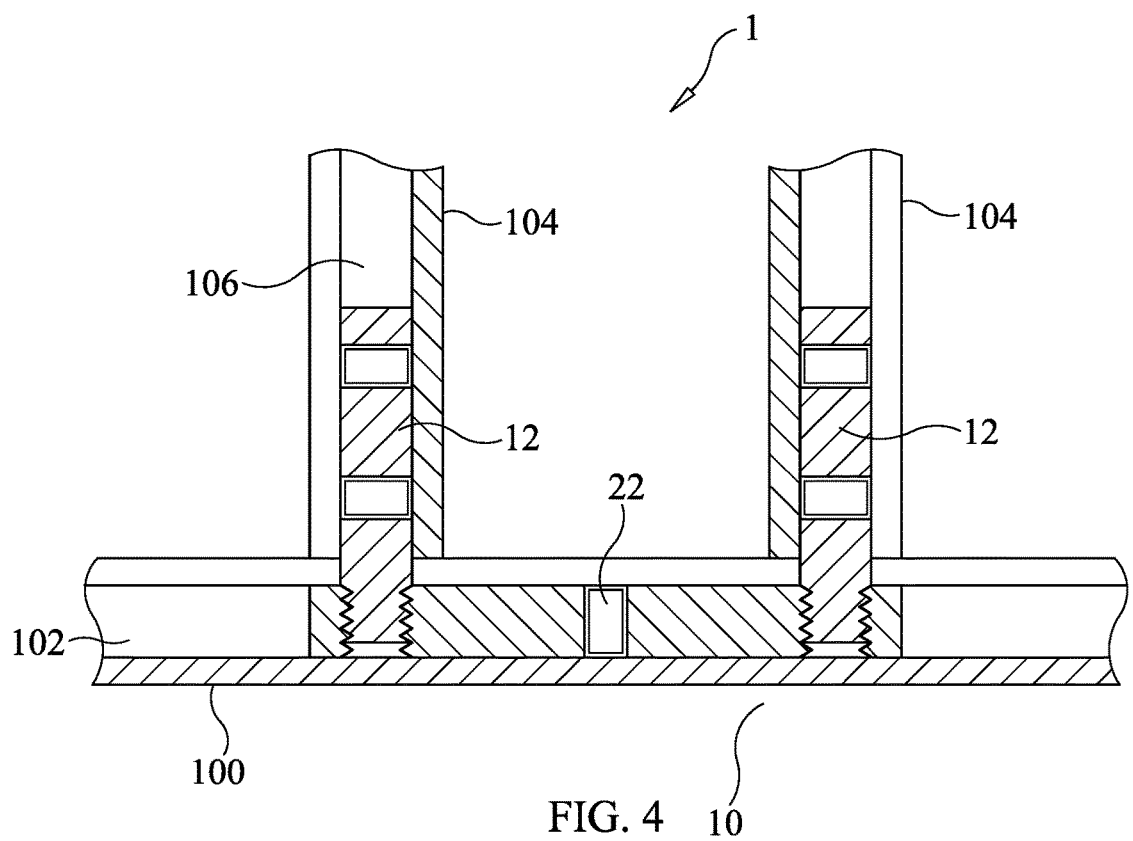
FIG. 4 is a cross sectional view cut through FIG. 3 illustrating two vertical extrusions attached to a horizontal extrusion with a hidden extrusion connector in accordance with the present invention.

With reference now to the drawings, and particularly to FIG. 1, there is shown a perspective view of a hidden extrusion connector 1. The hidden extrusion connector 1 preferably includes a base bar 10 and at least one vertical bar 12. With reference to FIG. 2, the base bar 10 includes a rectangular cross section 11, which is sized to be received by an inner channel 102 of a first extrusion 100. The inner channel 102 includes first opposing side walls 103, 105 and first inner flange surfaces 107, 109. Opposing sides of the base bar 10 are slidably retained between the first opposing side walls 103, 105. A top surface of the base bar 10 is slidably retained by the first inner flange surfaces 107, 109. A plurality of base threaded holes 14 are formed vertically through the base bar 10. Three base threaded holes 14 are shown in FIG. 1. However, the base bar 10 may be lengthened to include more than three base threaded holes 14. With reference to FIGS. 3-4, each vertical bar 12 includes a rectangular section 16, which includes a cross section that is sized to be received by an inner channel 106 of a second extrusion 104. The inner channel 106 includes second opposing side walls 111, 113 and second inner flange surfaces 115, 117. Opposing sides of the vertical bar 12 are slidably retained between the second opposing side walls 111, 113. A top surface of the vertical bar 12 is slidably retained by the second inner flange surfaces 115, 117. A plurality of threaded holes 18 are formed horizontally through the vertical bar 12. Two threaded holes 18 are shown in FIG. 1. However, the vertical bar 12 may be heightened to include more than two threaded holes 18. A threaded post 20 extends from a bottom of the rectangular section 16. An outer diameter of the threaded post 20 is substantially equal to a thickness "A" of the rectangular section 16. The threaded post 20 is sized to be threadably received by one of the plurality of base threaded holes 14 in the base bar 10. The plurality of threaded holes 14, 18 in the base and vertical bars 10, 12 are also sized to threadably receive a set-screw 22.

Figure 5:
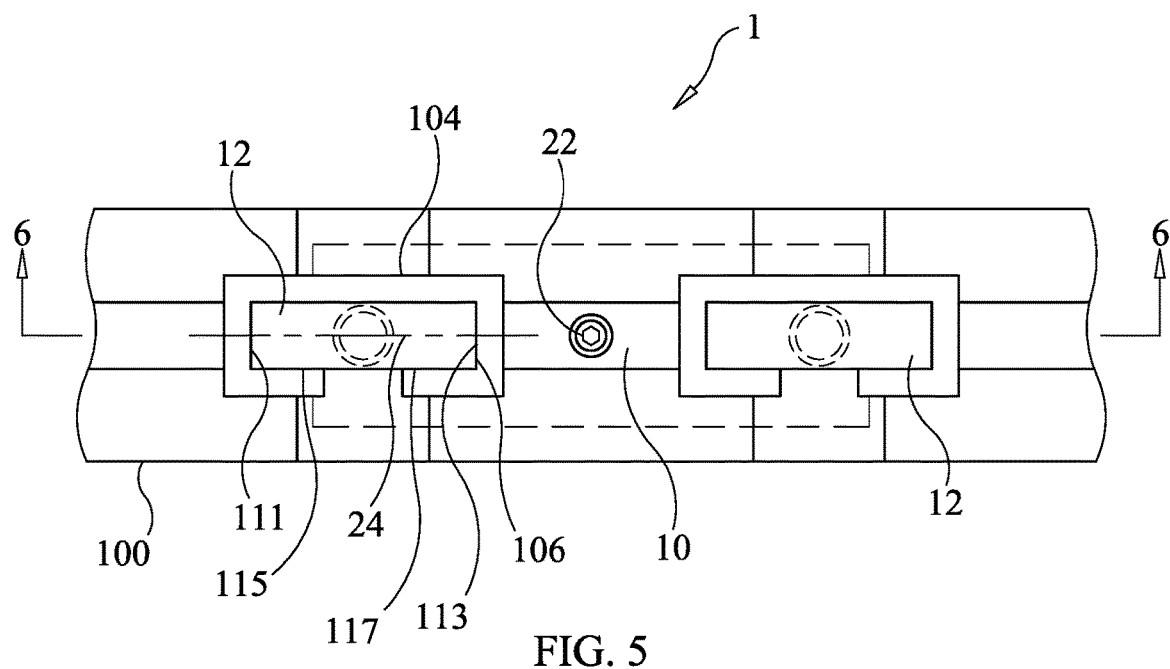
FIG. 5 is a top view of two vertical extrusions turned 90 degrees relative to FIG. 3 and attached to a horizontal extrusion with a hidden extrusion connector in accordance with the present invention.
Figure 6:
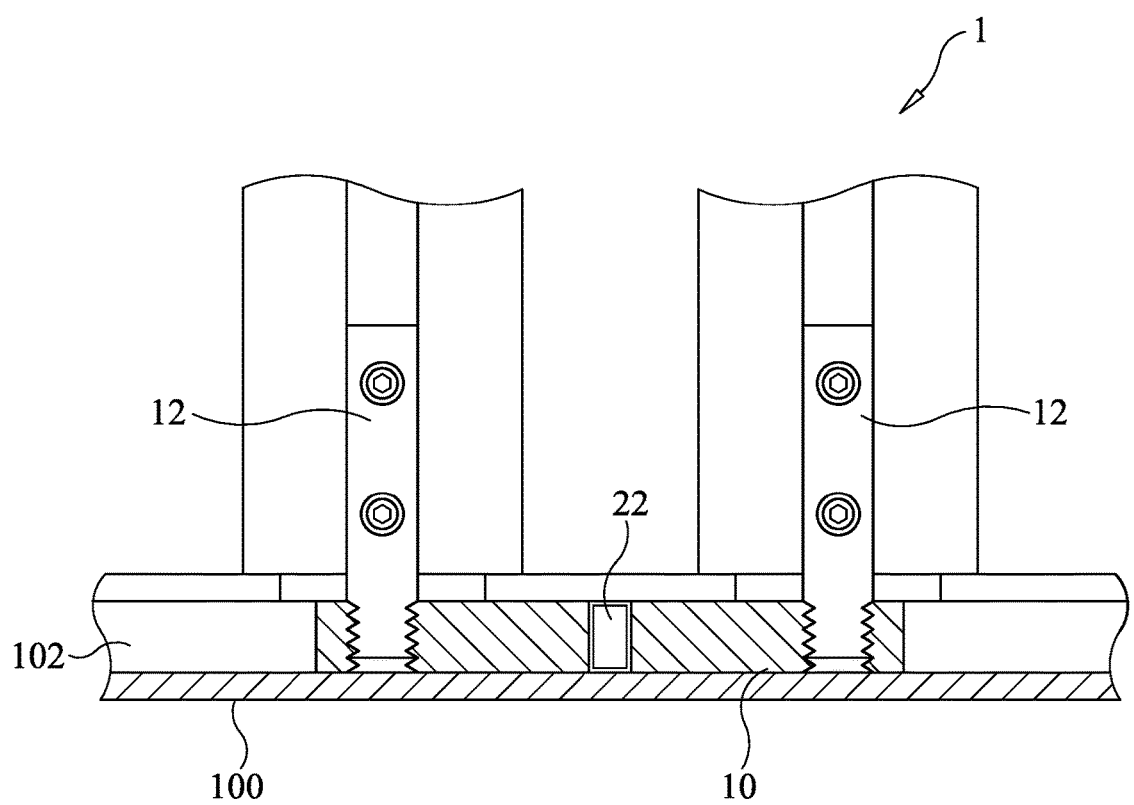
FIG. 6 is a cross sectional view cut through FIG. 5 illustrating two vertical extrusions attached to a horizontal extrusion with a hidden extrusion connector in accordance with the present invention.

In use, the base bar 10 is slipped into the inner channel 102 of the first extrusion 100. The vertical bar 12 is slipped into the inner channel 106 of the second extrusion 104. The threaded post 20 of the vertical bar is screwed into one of the plurality of base threaded holes 14, until the rectangular section of the vertical bar 12 is secured against the first extrusion 100. The two set screws 22 in the vertical bar 12 are tightened against the second extrusion 104. The set screw 22 in the base bar 10 is also tightened to secure the first extrusion 100 to the second extrusion 104. With reference to FIGS. 5-6, the vertical bar 12 may also be pre-threaded into the base bar 10 and then inserted into the inner channel 102 of the first extrusion 100, if a lengthwise axis 24 of a cross-section of the rectangular section 16 of the vertical bar 12 is parallel to a lengthwise axis of the base bar 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A hidden extrusion connector for connecting a first extrusion to a second extrusion, the first extrusion includes a first channel, the second extrusion includes a second channel, comprising:
   a base bar having a plurality of base threaded holes formed there through, a cross section of said base bar is sized to be received by the first channel, wherein at least one fastener is tightened in one of said plurality of base threaded holes to secure said base bar in the first extrusion; and
   at least one vertical bar includes a rectangular section and a threaded post, said threaded post extends from a bottom of said rectangular section, said threaded post is threadably engagable with said plurality of base threaded holes, at least one threaded hole is formed through said vertical bar, a cross section of said rectangular section is sized to be received by the second channel, said at least one vertical bar is configured to be assembled to said base bar, before insertion into the respective extrusion.

2. The hidden extrusion connector of claim 1 wherein:
   an outer diameter of said threaded post is substantially equal to a thickness of said rectangular section.

3. A hidden extrusion connector for connecting a first extrusion to a second extrusion, the first extrusion includes a first channel, the second extrusion includes a second channel, the first channel includes first opposing side walls and first inner flange surfaces, comprising:
   a base bar having a plurality of base threaded holes formed there through, opposing sides of said base bar are configured to be slidably retained between the first opposing side walls, a top surface of said base bar is configured to be slidably retained by the first inner flange surfaces, wherein at least one fastener is tightened in one of said plurality of base threaded holes to secure said base bar in the first extrusion; and
   at least one vertical bar includes a rectangular section and a threaded post, said threaded post extends from a bottom of said rectangular section, said threaded post is threadably engagable with said plurality of base threaded holes, at least one threaded hole is formed through said vertical bar, a cross section of said rectangular section is sized to be received by the second channel, said at least one vertical bar is configured to be assembled to said base bar, before insertion into a respective extrusion.

4. The hidden extrusion connector of claim 3 wherein:
   an outer diameter of said threaded post is substantially equal to a thickness of said rectangular section.

5. A hidden extrusion connector for connecting a first extrusion to a second extrusion, the first extrusion includes a first channel, the second extrusion includes a second channel, the second channel includes second opposing side walls and second inner flange surfaces, comprising:
   a base bar having a plurality of base threaded holes formed vertically there through, a cross section of said base bar is sized to be received by an inner channel of a first extrusion; and
   at least one vertical bar includes a rectangular section and a threaded post, said threaded post extends from a bottom of said rectangular section, said threaded post is threadably engagable with said plurality of base threaded holes, at least one threaded hole is formed horizontally through said vertical bar, opposing sides of said vertical bar are configured to be slidably retained between the second opposing side walls, a top surface of said vertical bar is configured to be slidably retained by the second inner flange surfaces, wherein at least one fastener is tightened in said at least one threaded hole to secure said vertical bar in the second extrusion, said at least one vertical bar is configured to be assembled to said base bar, before insertion into a respective extrusion.

6. The hidden extrusion connector of claim 5 wherein:
   an outer diameter of said threaded post is substantially equal to a thickness of said rectangular section.

\* \* \* \* \*